United States Patent Office 3,183,254
Patented May 11, 1965

3,183,254
ORGANIC SILICONE COMPOUNDS AND METHOD FOR PRODUCING SAME
Gerd Rossmy, Altendorf (Ruhr), and Jakob Wassermeyer, Dusseldorf, Germany, assignors to Th. Goldschmidt A.-G., Essen, Germany
No Drawing. Filed Jan. 25, 1962, Ser. No. 168,833
Claims priority, application Germany, Oct. 28, 1959, G 28,256; G 28,257; Feb. 18, 1960, G 29,058
10 Claims. (Cl. 260—448.2)

This is a continuation-in-part application of our co-pending applications Serial Nos. 35,138 and 35,139, filed June 10, 1960, both now abandoned and 108,755, filed May 9, 1961, now U.S. Patent No. 3,115,512 granted December 24, 1963.

This invention generally relates to a method of producing organosiloxanes having terminal halogen or alkoxy groups and more particularly is concerned with a method of producing organosiloxanes having terminal or end blocking halogen or alkoxy groups and having sulphate groups incorporated in the siloxane chain and to the novel siloxanes thereby produced.

The invention is also concerned with the products obtained by the reaction of the above-mentioned organosiloxanes with water and organic hydroxyl compound.

Siloxanes with terminal halogen atoms have found numerous applications in the chemistry of silicones.

The organosiloxanes having terminal halogen or alkoxy groups have utility as intermediaries in the synthesis of silicone compounds and may be directly used for improving the surface characteristics of glass.

The reaction products of the organosiloxanes, having end blocking halogen or alkoxy groups, with water and/or organic hydroxyl compounds are of utility as lubricants, dielectric fluids, synthetic resins, paint and varnish vehicles, heat transfer media, hydrophobic agents for fabrics and ceramics, hydraulic fluids and intermediates in the production of siloxane elastomers. Some of them are also useful as surface active agents in the production of polyurethane foams.

α,ω-Chlorosiloxanes of the general formula:—

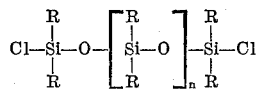

wherein each R represents a hydrocarbon radical, which may possibly be substituted, as for example, methyl, ethyl, cyclohexyl, phenyl, 4-chloro-phenyl, 3-fluor-propyl radicals, and wherein the R's may represent the same or different hydrocarbon radicals, and $n$ is an integer equal to at least 1 are eminently suitable, for instance, for performing reactions with alcohols, amines, and other compounds containing reactive hydrogen.

Formerly such siloxanes were produced by incomplete hydrolysis of the corresponding diorgano-dichlorosilanes, that is, by dissolving water and the silanes in solvents, such as dioxane and diethyl ether. The considerable expenditure in inflammable and costly solvents required in this procedure reduces the value of this method and makes it impractical for large scale operations. Moreover, the α,ω-chlorosiloxanes are obtained in this method as a mixture of many compounds with different and unpredictable values for $n$.

In particular they are not in statistical equilibrium. The same situation applies to the corresponding α,ω-alkoxy siloxanes.

Objects of the present invention are to provide improved methods for the production of organosiloxanes of definite structure, to provide improved methods for the production of well equilibrated mixtures of α,ω-halo or α,ω-alkoxy siloxanes, to provide improved methods for the production of completely equilibrated organosiloxane polymers and to provide novel organosiloxane compositions having sulphate groups incorporated into their molecules.

Another object is to provide useful organosilicones by reacting the inventive organosiloxanes with water.

It is also an object of this invention to produce new polyalkyl and/or polyaryl silicic acid esters by reacting the inventive organosiloxanes with organic hydroxyl compounds.

Other objects and advantages of the present invention will be evident from the following description.

In accordance with the invention, it has now been found that well equilibrated mixtures of α,ω-halo-polysiloxanes or of α,ω-alkoxy-poly siloxanes are obtained if silyl sulphate groups are incorporated in the siloxane chain.

In accordance with the invention, polysiloxanes of the general formula:

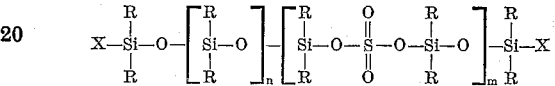

wherein the various R's represent monovalent hydrocarbon radicals, X stands for a halogen atom or an alkoxy group and $n$ and $m$ are numbers are prepared by performing an equilibration reaction between reaction products of a diorgano-dihalo-, or diorgano-dialkoxy-silane, sulphuric acid, and water. The reaction may be carried out in several stages or, alternatively, the reaction can be effected in one stage without any isolation of intermediate products.

In the process in accordance with the invention, all of the reaction products of diorgano-dihalo-, or diorgano-dialkoxy-silanes with water and/or sulphuric acid are suitable as starting materials. Thus, there can be employed with advantage the pure cyclic siloxanes or the corresponding polymers and their silyl sulphates as well as the products of incomplete reactions still containing halogen atoms or alkoxy groups.

Silyl sulphates of the general formula:

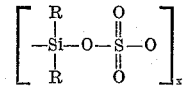

in which R has the meaning defined above and $x$ is a whole number, which silyl sulphates can be readily obtained by reaction of dialkyl siloxanes and chlorosulphonic acid, can be mixed with a partly hydrolyzed dialkyl dihalo- or dialkoxy-silane and equilibrated therewith, preferably at elevated temperatures. The partly hydrolysed dialkyl dihalo-, or dialkoxy-silane may be produced for instance by the known solvent method in which the ether-dioxane mixture may be replaced with advantage by tetrahydrofurane. Alternatively, the diorgano-dihalo-, or diorgano dialkoxy-silane may first be reacted with a quantity of sulphuric acid which is insufficient for completely liberating the hydrogen halide or alcohol and then mixed with a cyclic diorgano-siloxane for the purpose of equilibration.

The method of the invention can be most advantageously and simply effected if the diorgano-dihalo- or dialkoxy-silane is hydrolyzed with a mixture of water and sulphuric acid.

This gives rise to the production of a mixture of diorgano-dihalo-, or diorgano dialkoxy-silanes and relatively long-chain siloxanes containing silyl sulphate groups being endblocked by halogen and/or alkoxy-groups, which mixture stratifies into two layers. The mixture is vigorously stirred and the temperatures which are preferably at first limited to the boiling point of the silane are then gradually raised up to about 150° C., where the equilibration is allowed to proceed.

The fact that the reaction mixture becomes homogeneous indicates that equilibration has been effected. However, it is best to continue the reaction for a few more hours after this point has been reached. The method just described is exemplified by the equation following:

$(n + 2m + 2)R_2SiX_2 + (n + m + 1)H_2O + mH_2SO_4 \longrightarrow$

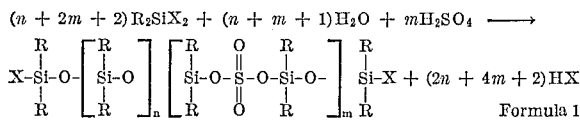

Formula 1 wherein R has the meaning defined above, X represents a halogen atom or an alkoxy group, as, for example, a -methoxy, ethoxy or isopropoxy group or chlorine radical, and $n$ is any number including zero and $m$ is a number.

The reaction produces well-defined compounds with precisely reproducible properties. The values of $n$ and $m$ in the above formula are practically arbitrary. The lower limit of $m$ is determined by the time available for equilibration. Preferably the values are for $m$, from 0.001 to 10 and for $n$ from 0 to 200. The upper limit of $n$ is determined by the desired viscosity of the final siloxane product. The compounds thus obtained are suitable for nearly any purpose for which $\alpha,\omega$-chlorosiloxanes have been used in the past. However, they are superior to the previously known $\alpha,\omega$-chlorosiloxanes by virtue of their more readily reproducible properties and of the fact that they are produced by a more economical method.

While the inventive process has been explained hereinabove in connection with di-functional silanes (i.e. silanes with two hydrolyzable groups) for reasons of clarity and simplicity, it should be realized that the process is not limited to such di-functional silanes. In fact, we have ascertained that the reaction can be successfully carried out with lower and higher functional silanes which thus permit the preparation of any desired linear or branched siloxane system having end-blocking halogen or alkoxy groups. Generally, the reaction of di-functional silanes according to Equation 1 may be carried out without solvent. This also applies to systems containing di- and tri-functional silanes with up to about 20 mole-percent of tri-functional silanes. However, if larger amounts of tri-functional or four-functional silanes are employed, it is advantageous to facilitate the reaction mechanism by employing a solvent such as aromatic hydrocarbons, aliphatic hydrocarbons which may be halogenated, and ethers. As example we may mention benzene, carbon tetrachloride, hexene and diethyl ether and dioxane.

If larger amounts of tri-functional silanes are involved, it may also be of advantage to employ a stepwise reaction as shown in the following example which concerns the preparation of a silicone resin produced from dimethyl dichlorosilane and methyl trichlorosilane. Conveniently the dimethyl dichlorosilane is first reacted with aqueous sulphuric acid in the manner described hereinabove and the resultant reaction mixture is thereafter equilibrated.

The compounds produced by this reaction have the formula:

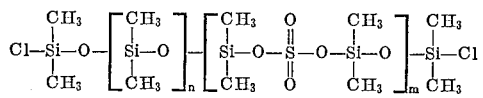

in which $m$ and $n$ may be fairly arbitrarily selected, the upper limit of $m$ and $n$ being determined by the desired viscosity, and the lower limit of $m$ being determined by the available equilibration time.

Preferably $n$ is equal to 0–200 and $m$ is equal to 0.001–10. These compounds are then heated under reflux while being vigorously stirred with methyl trichlorosilane until the latter is incorporated in the siloxane. Equilibration is then performed while the temperature preferably is further increased to about 150° C. The resultant compounds have the compositions given by the following formula (the formula does not include every possible structural unit):

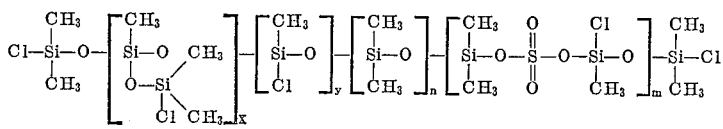

in which $x$, $y$, $n$ and $m$ are numbers. Such compounds can now be completely hydrolyzed preferably with the aid of a solvent, or, alternatively, a quantity of water or aqueous sulphuric acid, insufficient for complete hydrolysis, may be added thereto, possibly in the presence of a solvent, the compounds being equilibrated again, and then re-equilibrated with further quantities of methyl trichlorosilane, until finally the actual silicone resin is obtained by the completion of hydrolysis.

As a result of this procedure three-dimensionally interlinked organo-siloxanes are obtained in which the structural distribution largely conforms with statistical equilibrium.

The inventive reaction may be broadly defined by the following Formula 2:

$$R_xSiX_{4-x}+yH_2O+zH_2SO_4 \rightarrow$$

$$R_xSiO_y(SO_4)_zX_{4-(x+2y+2z)}+2(y+z)HX$$

wherein R is a member selected from the group consisting of hydrogen and monovalent substituted and/or unsubstituted hydrocarbon radicals being devoid of active hydrogen and mixture of these radicals; X is a member selected from the group consisting of chlorine, bromine, iodine and alkoxy and mixture of these radicals at least one-tenth of X being chlorine, $x$, $y$ and $z$ being numbers being defined by $$1 \leq x < 3$$

$$y = 0.5 - 1.5$$

$$z = 0.0001 - 0.5$$

$$4 > (x+2y+2z) > 2$$

Preferred R groups are, for example, methyl, ethyl, hydrogen, phenyl, $\gamma$-cyanopropyl, $\gamma$-acyloxypropyl, $\beta$-carboethoxy ethyl, $\gamma$-halogenpropyl and chlorinated phenyl. Chlorine is the preferred X group. Preferred values for $x$, $y$ and $z$ are $$x = 1.5 - 2.1$$

$$y = 0.9 - 1.3$$

and $$z = 0.01 - 0.15$$

It will be realized that Equation 2 encompasses Equation 1.

The total combined molar amounts of water and sulphuric acid pro mole of silane or silane mixture according to Equation 2 is between the limits $$\frac{4-x}{2} > y+z > 0.5$$

In calculating the amounts of water and sulfuric acid which are required for the reaction with silane, it should be considered that certain losses will occur, predominantly due to evaporation of silane. These losses may be kept very low by the cooling of the reaction mixture which is a result of evaporating hydrohalide. This evaporation may result in a cooling of the reaction mixture to temperatures of about −25° C.

In this manner the losses of silane calculated on the theoretical amount as required by Formulae 1 and 2 may be kept below 5%. This, of course, means that the theoretical amount of silane should be correspondingly increased. Unfavorable reaction conditions may require a higher excess of silane. However, it will be realized that escaping silane may be recovered and recycled to the reaction mixture.

It will be realized that Formulas 1 and 2 only illustrate the overall reaction. As previously mentioned, the reaction may be carried out in several stages. For example if $$R_xSiX_{4-x}$$

represents a mixture of different silanes one or several of which may be decomposed by sulfuric acid with regard to R, then the sulfuric acid and the water will be allowed to react with that moiety only whose R constituent is not affected by the acid. Thereafter, the reaction mixture, excluding the moiety which may be affected by sulfuric acid, is equilibrated and the equilibrated product is then admixed with the sulfuric acid-sensitive moiety. The resulting mixture is then again equilibrated to obtain a final equilibrated product. The equilibration steps referred to should be carried out at temperatures of about between 30–200° C. A preferred temperature range is 50–150° C. Of course, the reaction may be divided into several stages, each of which is followed by equilibration. In this connection, it should be mentioned that according to a preferred mode of operation, the X-moiety, wherein X stands for alkoxy, should not be included in the first stage wherein free sulfuric acid is reacted with the silane, but in this first stage an X-moiety wherein X stands for chlorine should be employed. In this connection, reference is had to Example 6.

The inventive products defined by Equations 1 and 2 may be subjected to hydrolysis. In doing so, all SiX and SiSO$_4$Si groups are split off and substituted by OH. The OH end-blocked siloxanes thus obtained are useful as impregnating agents. They are predominantly obtained in case the liberated acids HX and H$_2$SO$_4$ are immediately neutralized by the presence of a neutralizing agent as for example, ammonia, alkali metal carbonate or bicarbonate, alkali metal hydroxide, ammonium carbonate, and the like.

It will be realized that the SiOH groups may be condensed to SiOSi groups by acid catalysis and/or heat treatment. It should be observed that the final products of the hydrolysis and condensation need not be further equilibrated. This is of particular importance in instances wherein the organosiloxane contains different organosiloxy units, one or several of which cannot be equilibrated with sulfuric acid owing to side reactions.

As is known by simple hydrolysis of a mixture of differently substituted halo-, or alkoxy-silanes, it is difficult to obtain siloxanes in which the statistical distribution of the structural units corresponds with that in the halo-, or alkoxy-silane mixture. Equilibration of a mixed siloxane thus obtained is often impossible, either because the molecular weight is too high, or because the constitution of the siloxane does not permit the use of sulfuric acid or of other known equilibrating catalysts.

The above hydrolyzation procedure is also eminently suitable for the production of silicone oils from different dihalosilanes. Inter alia satisfactory co-hydrolyzates of dimethyl dichlorosilane and organo-functional diorgano-dihalosilanes as well as co-hydrolyzates of dimethyl dichlorosilane and methyl dichlorosilane may be obtained. End-blocking trialkyl silyl groups may be added to the system in one of the hydrolyzing or equilibration stages in the form of trialkyl halo, or alkoxy-silanes, trialkyl silyl sulphates, or hexa-alkyl disiloxanes.

If these equilibration products according to the invention $$R_aSiO_n(SO_4)_mX_{4-(a+2n+2m)}$$

are used for producing organo-siloxanes with various organo-siloxane units by means of hydrolysis it is of great advantage to apply the above mentioned stepwise procedure for producing these equilibration products. Thus the equilibration product of the above described formula to be hydrolysed contains in this case at least two different R-radicals and/or the equilibration product contains at least two Si-atoms which are differing from each other by the number of R-radicals being bonded to them.

Also in case of a stepwise production of the mixture of siloxanes $$R_aSiO_n(SO_4)_mX_{4-(a+2n+2m)}$$

the equation of the Reaction 2 remains altogether fulfilled.

The following example explains this stepwise production: A silicon oil shall be produced from a mixture of equimolar quantities of dimethyl dichlorosilane and γ-acetoxypropyl-methyl-dichlorosilane. If this mixture were reacted directly with water and sulphuric acid a large portion of the acetoxypropyl-groups were saponified. Therefore one proceeds as follows: The mixture contains 23.3 moles of each of the silanes mentioned. At first 22.3 moles (CH$_3$)$_2$SiCl$_2$ are reacted with 21.5 moles of water and 0.35 mole of sulphuric acid, whereafter they are equilibrated at a temperature of 100° C. and (without considering the losses) a mixture of siloxanes is obtained having the general formula $$Si(CH_3)_aO_n(So_4)_mCl_{4-(a+2n+2m)}$$

$$a=2$$

$$n=\frac{21.15}{22.13}$$

$$m=\frac{0.35}{22.13}$$

22.3 moles of γ-acetoxypropyl-methyl-dichlorosilane are added to this siloxane by further equilibration, for example at a temperature of 100° C., and a homogeneous mixture of siloxanes are obtained having the general formula $$R_aSiO_n(SO_4)_mCl_{4-(a+2n+2m)}$$

The general preparation took place according to the equation:

$$R_aSiCl_2+nH_2O+mH_2SO_4=$$
$$R_aSiO_n(SO_4)_mCl_{4-(a+2n+2m)}+2(n+m)HCl$$

wherein there are $$R=\left[(CH_3)_{0.75}(C_3H_6O\overset{O}{\overset{\|}{C}}\cdot CH_3)_{0.25}\right]$$

$$n=\frac{0.5\cdot 21.15}{22.13}$$

$$m=\frac{0.5\cdot 0.35}{22.13}$$

$$a=2$$

According to the invention this mixture of siloxanes is then finally submitted to hydrolysis.

The term "polysiloxane" as used herein refers to the fact that the compounds so designated have a skeletal structure of alternate atoms of silicon and oxygen. The structure may be either of the straight or branched chain type.

As previously mentioned, the invention is also concerned with a new polyalkyl and/or polyaryl silicic acid esters and with a process for preparing such compounds. Considered from this aspect, the invention is particularly concerned with the preparation of polyalkyl and/or polyaryl silicic acid esters of the general formula:

$$R_a(OZ)_b SiO_{2-(1/2)(a+b)}$$

in which R represents a monovalent hydrocarbon radical or mixture of such radicals selected from the class consisting of lower alkyl, aryl, alkaryl, aralkyl and alkenyl radicals, examples of which are —$CH_3$, —$C_2H_5$, isopropyl, cyclohexyl, 4 - chlorobutyl, 3 - acetoxy - propyl, phenyl, naphthyl, in which Z represents a mono- or polyvalent hydrocarbon radical or mixture of such radicals, such as —$CH_2$, —$CH_3$, —$C_2H_5$, —$C_3H_6$, cyclohexyl, 2,4-dichlorobenzyl,

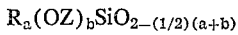

phenyl $[R'(C_nH_{2n}O)_m]$ in which R' represents any monovalent hydrocarbon radical, preferably a lower alkyl radical, $n$=any number, higher than 1, preferably 2 and 3, $m$=any number, preferably 1–100 (in derivates of polyvalent hydroxyl compounds Z represents the portion of the molecular structure which corresponds with one hydroxyl group, so that in the case of glycol Z would be, for instance, $CH_2$) and in which $a$ represents a number of from 0.9 to 2.2, preferably 1.5 to 2.1, and $b$ a number of from 0.01 to 1, the sum of $(a+b)$ being expressed by $3>(a+b)>1$.

Polyalkyl and/or polyaryl silicic acid esters of the above general formula were formerly generally produced by one of four different methods:

The first method consists of reacting the corresponding halo-siloxanes $$R_a X_b SiO_{2-1/2(a+b)}$$

in which R, $a$ and $b$ have the meanings defined above, and in which X represents a halogen atom, such as chlorine, bromine, or iodine with the appropriate hydroxyl compound $(ZOH)_n$ in which $n$ represents the number of reactable hydroxyl groups in the hydroxyl compound and by neutralizing the liberated acid HX with the aid of a base. The objection to this method is principally the inaccessibility of the siloxane starting material and, in the case of longer-chain siloxanes, the badly defined and difficultly reproducible polymer distribution.

The second method is effected by the partial hydrolysis of monomeric alkoxy compounds $R_a Si(OZ)_{4-a}$; in which R, $a$ and Z have the meaning defined above.

This method involves a high expenditure of hydroxyl compounds and also produces polysiloxanes having a difficultly reproducible polymer distribution which is not in equilibrium.

In the third method the re-esterification of the compound obtained by the second method set out above with another hydroxyl compound with the aid of alkaline or acid catalysts is brought about. The resulting compounds have the same characteristics and disadvantages as those obtained by the second method.

The fourth method consists of an alkaline catalyzed equilibration of monomer alkoxysilanes with cyclic dialkylsiloxanes. With this method the necessity for producing cyclic siloxanes has proved to be inconvenient. Besides this, the method is limited to polyalkylsilicic acid esters, which are indifferent against alkali and which are furthermore not or only little branched.

According to this aspect of the invention, an improved, simple and inexpensive method for the production of polyalkyl and/or polyaryl silicic acid esters is provided, which produces polyalkyl- and/or polyaryl silicic acid esters of definite structure and which have a polymer distribution which is in approximately statistic equilibrium.

In accordance with the invention, poly-alkyl and/or polyaryl silicic acid esters which have the general formula set out above, and which have a polymer distribution which is in approximately statistical equilibrium can readily and economically be obtained by reacting with organic hydroxyl compounds the organo-polysiloxanes of the Formula 2.

As shown in the examples, these methods of production can also be applied to the extremely branched siloxane systems, particularly when the water/sulfuric acid mixture is dissolved in a solvent during the production.

As previously mentioned, these organo siloxanes are distinguished in that the hydrocarbon radicals which may be the same or different, are statistically uniformly distributed on the siloxane chain, and that the polymer distribution itself is likewise in statistical equilibrium or at least considerably approximates to such equilibrium.

If these compounds are reacted with organic hydroxyl compounds, the silicon halide and silicon sulphate groups are split off with the formation of Si—OZ bonds. Preferably the liberated acid is neutralized with a base in order to improve the yield. Suitable bases include, for instance, metal hydroxides or their alkoxy derivates, such as sodium methylate, ammonia, amines and pyridines.

The resultant polyalkyl or polyaryl silicic acid esters are thus not only more economically obtainable than hitherto, but their properties are also more uniform and better balanced because of the approximate equilibrium of polymer distribution, so that they may with justification be called a novel class of compounds.

The characteristic properties impressed upon the substances by the alkyl siloxane and alkoxy groups can therefore be much more satisfactorily controlled. This is of especial importance if these properties are invested with opposite characteristics, as is the case for instance in polysiloxanes which have been water-solubilized by means of polyethylene glycol monoalkyl ether terminal groups (or corresponding derivates of polypropylene glycol).

With the aid of the compounds obtained by the method herein proposed, a siloxane chain of greater average length can be brought into aqueous solution with the same expenditure of polyether groups than was possible by the method hitherto known to the art.

According to the invention, it is possible to produce, besides the siloxane-poly alkyleneoxyd-block-copolymers already known, such modified siloxanes of quite new structures.

An example for those new substances are the compounds of the general Formula A:

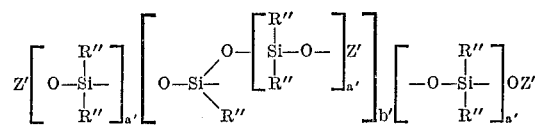

These compounds are defined best for the expert by the above formula, though they can, of course, be defined by the formula $$R_a(OZ)_b SiO_{2-1/2(a+b)}$$

The experts know, of course, that the chosen formula shows only the gross composition and not the fine details of the structure of the polymeric compound. Thereby Z' means a lower alkyl radical or $[R'(C_nH_{2n}O_m]$, R' represents a monovalent hydrocarbon radical, any radical may be used, preferably a lower alkyl radical or phenyl or alkylphenyl, $n$ being 2 or 3, $m$ representing any number, preferably 1–100, R" represents a lower alkyl radical—preferably methyl—and phenyl, vinyl, allyl; the radicals may be of the same kind or different, $a'$ represents a number from 0.5 to 100, preferably 1 to 20, $b'$ being a number from 2 to 50, preferably from 2 to 20.

Formula A is also intended to include compounds which derive from compounds of the formula by replacing pairs of SiOZ'-groups of different molecules by Si—O—Si-linkages, enlarging thus the average molecular weight. In the case of these higher molecular compounds the scope of the invention is also intended to include substances which derive from compounds of Formula A and in which $b'$ equals 1. Naturally some of the OZ' groups may be replaced by OH groups. Such OH groups attached to Si atoms arise for instance in the production of substances according to the invention in the presence of small amounts of moisture.

The production of these compounds according to the invention is effected by converting poly-glycol-monoalkyl (aryl) ethers with the suitable starting materials according to the invention $$R''_xSiO_y(SO_4)_zX_{4-(x+2y+2z)}$$

Such starting materials according to the invention are obtained (the mole dates $a'$ and $b'$ refer to the a.m. of Formula A) by converting and equilibrating $(2a'+a'b')$ moles $R''_2SiX_2$ and $b'$ moles $R''SiX_3$ with $$(2a'+b'a'+b'-1)$$

moles of water and a certain amount of sulfuric acid.

It is preferred to effect this conversion in one stage (hydrolysis with subsequent equilibration), but it is also possible to effect the same in several stages, solvents can also be used. The quantity of the sulfuric acid required depends on the composition of the halosilane mixture and the equilibration temperature (30–150° C.); it is limited in its maximum by the condition, that, together with water, it may not be sufficient for splitting off all halogen atoms from silicon, therefore it must be less than $(0.5b'+1)$ moles. The so produced starting materials according to the invention are reacted as known with the compound Z'OH, preferably by neutralizing the liberated acids HX and $H_2SO_4$ with ammonia or amines.

The so-produced compositions of Formula A are suitable as intermediate product for the production of resin like silicone coatings, when Z' represents $[R'(C_nH_{2n}O)_m]$ also as foam stabilizing additions for the polyurethan-foam production according to the "one shot" procedure.

The properties of the compounds produced by the method according to the invention naturally largely depend upon the organo-silicon and hydroxy compounds used. Reference has already been made to the special importance of the compounds which are derived by treatment with the polyglycol monoalkyl ethers.

The use contemplated for derivatives of low molecular aliphatic alcohols is entirely different. In the majority of cases the alkoxy group is intended to limit the molecular weight of the neutral siloxane for the purpose of a transfer or exchange process in order to permit them to be split off easily in substantially or wholly neutral conditions with the simultaneous considerable enlargement of the molecular structure of the siloxane.

The products of this invention may be employed for any of those uses for which polyalkyl and/or polyaryl silicic acid esters are normally employed. Some of them may also be employed as brake fluids, synthetic resins, paints and varnish for vehicles, heat transfer media, hydrophobic agents for fabrics, cements and ceramics, hydraulic fluids and intermediates in the production of synthetic elastomers.

The following examples illustrate specific modes of employing the process of the present invention:

Example 1

A solution of 16.4 parts by weight of sulfuric acid in 30.3 parts by weight of water is added dropwise to 258 parts by weight of dimethyl dichlorosilane while the latter is stirred. The liberated hydrogen chloride is first passed through a reflux condenser which is cooled to −20° C. with a solution of brine in order to remove any dimethyl dichlorosilane entrained by the hydrogen chloride. When the dropwise addition has been completed, the temperature is gradually raised to 120° C. This causes the reaction product, which first forms two layers, to homogenize. Equilibration of the reaction mixture is continued at this temperature for a further 7½ hours. The values of $n$ and $m$ in the polysiloxane according to Formula 1 formed as determined by analysis are $n=10.2$ and $m=1.24$ and a light and slightly viscous reaction product is obtained.

Example 2

A mixture of 9.8 parts by weight of sulfuric acid and 75.6 parts by weight of water is slowly added dropwise to 568 parts by weight of dimethyl dichlorosilane. The liberated hydrogen chloride is passed through a reflux condenser cooled with brine to −20° C. for the purpose of removing entrained dimethyl dichlorosilane.

The temperature of the contents of the flask is gradually raised to 120° C. in the course of 245 hours. The homogenized reaction mixture is then equilibrated at this temperature for a further 10 hours. The reaction product is a water clear, viscous oil which upon analysis proved to have values for $n$ and $m$ according to Formula 1 of 76 and 1.71, respectively.

Example 3

30 parts by weight of an organosiloxane containing halogen and sulphate groups of the general formula

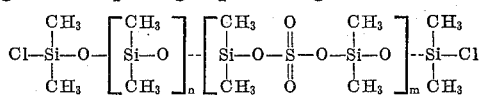

wherein $n$ has a value of 10.4 and $m$ a value of 1.26 were mixed with 8.26 parts by weight of methyl dichlorosilane and 0.065 parts by weight of trimethyl silylsulphate. The mixture was stirred at a temperature of 20° C. for 18 hours. Readily volatile constituents were driven off by distillation at 25° C. in a vacuum of 20 mm. Hg. In the distillation residue the percentage of active hydrogen bound to the silicon was 0.13%. In the course of 30 minutes the resultant product was introduced drop-wise into 63 parts by weight of water containing 1.8 parts by weight of tetrahydrofurane. The silico-organic phase was washed until neutral and after the addition of ethyl ether then dried with sodium sulphate. After the drying agent and the ether have been removed, the water clear oil contained 0.14% hydrogen bound to silicon.

Example 4

47.2 parts by weight of a siloxane containing halogen and sulphate groups and having the formula given in Example 3, in which the value of $n$ was 18.5 and that of $m$ 0.598, were mixed with 43.03 parts by weight of γ-acetoxypropyl methyl dichlorosilane and 2.25 parts by weight of trimethyl chlorosilane, and the mixture was equilibrated for 16 hours at a temperature of 60° C. the mixture being continuously stirred. 23 parts by weight of this homogeneous equilibrate were added dropwise to 20 parts by weight of a semi-concentrated solution of ammonia in water. The mixture which was still ammoniacal after this dropwise addition had been made was stirred for 5 hours. For improving separation 50 parts by weight of n-butanol were added, the organic phase was washed with water until neutral, and the butanolic solution was dried. The filtered product, after having been freed from solvent, was a water clear oil having a viscosity of 144.1 cp./20° C. The oil was miscible with ethanol in all proportions.

Example 5

140 parts by weight of a siloxane containing halogen and sulphate groups and having the formula given in Example 3, $n$ being 27 and $m$ being 1.58, were mixed with 45.3 parts by weight of γ-acetoxypropyl methyl dichlorosilane and 2.01 parts by weight of hexamethyl disiloxane and equilibrated for 17 hours at 60° C. The equilibrate was added dropwise to 200 parts by weight of a semi-concentrated aqueous solution of ammonia and the resultant ammoniacal mixture was stirred for 5 hours. The silico-organic phase was taken up in butanol, washed until neutral, and dried. The filtered oil freed from solvent was water clear and had a viscosity of 86 cp./20° C. The oil was miscible with ethanol in all proportions.

Example 6

150 parts by weight of a siloxane containing halogen and sulphate groups and having the formula given in Example 3 were equilibrated with 84.7 parts by weight of β-carbethoxy ethyl methyl diethoxysilane and 4.64 parts by weight of hexamethyl disiloxane for 19 hours at 60° C. while being stirred. The homogeneous equilibration mixture was then added dropwise to 220 parts by weight of a semi-concentrated aqueous solution of ammonia and the resultant ammoniacal mixture stirred for 5 hours at room temperature. The silico-organic layer was separated with butanol, washed until neutral, and dried. The oil remaining after removal of the drying agent and the solvent had a viscosity of 28.5 cp./20° C. The oil was miscible with ethanol in all proportions.

Example 7

593.4 parts by weight of dimethyl dichlorosilane were reacted in a round-bottom flask within two hours with a mixture of 19.7 parts by weight of sulfuric acid and 64.8 parts by weight of water. The escaping hydrochloric acid was freed in a cooling trap at a temperature of —60° C. from the silane carried down, which was then added again to the reaction mixture, consisting of two layers. The mixture was then heated to 60° C. and vigorously stirred at this temperature for 12 hours, whereafter the product was homogeneous and set into statistical equilibrium. A 100% yield was obtained. The Cl⁻ and SO₄⁻⁻ content was titrimetrically determined: 16.72% Cl⁻ and 4.315% SO₄⁻⁻. This corresponds to a product of the formula:

$$(CH_3)_2SiO_{0.75}(SO_4)_{0.039}Cl_{0.42}$$

83.2 parts by weight of pure methanol were added to 419 parts by weight of the equilibrated product. The reaction mixture was then saturated with gaseous ammonia. The precipitated ammonium salts were then filtered off and the filtrate was applied for distillation at a 25 cm.-column. 249 g. of the formed α,ω-dimethoxydimethylsiloxanes were distillable which corresponds to 72.7%; the residue of 27.3% could not be distilled. The distillable portion was detected in fractions and the different fractions were identified according to their boiling points and their methoxyl-contents. The following polymer distribution was obtained:

N represents the number of silicium atoms being linked together over Si-O-Si.

| N | KP,° C. | Torr | Methoxyl obtained, percent | Methoxyl theoretical, percent | Yield Gram | Yield Percent |
|---|---|---|---|---|---|---|
| 0 | 82 | 760 | 51.9 | 51.6 | 9.65 | 3.87 |
| 1 | 139 | 760 | 31.6 | 31.9 | 14.72 | 5.92 |
| 2 | 83 | 24 | 23.8 | 23.12 | 21.82 | 8.77 |
| 3 | 90 | 5 | 17.7 | 18.11 | 31.68 | 12.72 |
| 4 | 89 | 0.5 | 15.1 | 14.9 | 40.67 | 16.32 |
| 5 | 104 | 0.5 | 12.4 | 12.65 | 39.51 | 15.89 |
| 6 | 117 | 0.5 | 11.1 | 10.99 | 24.37 | 9.76 |
| 7 | 124 | 0.2 | 9.4 | 9.72 | 20.79 | 8.34 |
| 8 | 131 | 0.2 | 8.9 | 8.7 | 17.67 | 7.09 |
| 9 | 136 | 0.1 | 7.6 | 7.88 | 14.45 | 5.8 |
| 10 | 141 | 0.1 | 7.1 | 7.21 | 13.57 | 5.45 |

The polymer distribution shows a maximum for N=4, as it should be with a product according to Formula A (column 8) having the values of $$a'=2;\ b'=0;\ R''=CH_3;\ Z'=CH_3$$

Example 8

25.2 parts by weight of isopropylamine, dissolved in 100 parts by weight of dioxane, and 567 parts by weight of a polyethylene glycol monomethyl ether having a mean molecular weight of 1.220 were added to 188 parts by weight of a siloxane of the general formula $$(CH_3)_2SiO_{0.917}(SO_4)_{0.039}Cl_{0.088}$$

After separation of 29 parts by weight of a salt-like residue and removal of the solvent, 712 parts by weight of a waxy readily water-soluble substance was obtained. The ready solubility in water indicated that the polymer distribution in the reaction product was at least approximately in accordance with statistical equilibrium.

The experiment was repeated with the difference that the isopropylamine was replaced by equivalent quantities of triethylamine and diethylamine, and the results of the reactions in both cases were analogous.

Example 9

800 parts by weight of benzene and 447 parts by weight of a polyalkylene glycol monomethyl ether having a mean molecular weight of 1.685 obtained by linking equimolar quantities of ethylene oxide and propylene oxide with methanol, were added to 138 parts by weight of a siloxane of the general formula:

$$(CH_3)_2SiO_{0.935}(SO_4)_{0.006}Cl_{0.118}$$

An excess of ammonia was introduced into this mixture and, after filtration and the removal of the benzene at the end of one hour, 513 parts by weight of a viscous liquid were obtained which gave a clear solution in water.

Example 10

4000 parts by weight of an absolute benzene (absolutely waterfree benzene) and 2988 parts by weight of a polyalkylene glycol monobutyl ether having a molecular weight of 1703 obtained by adding equimolar quantities of ethylene oxide and propylene oxide to butanol, were added to 926.5 by weight of a siloxane of the general formula $$(CH_3)_{1.91}SiO_{0.97}(SO_4)_{0.0074}Cl_{0.135}$$

An excess of ammonia was introduced into this reaction mixture at a temperature of 22–38° C. After filtration the benzene was removed by distillation. 3160 parts by weight of a product were obtained, which correspond to a yield of 82.1%, having a viscosity of 1866 cp. and corresponding to Formula A (column 8) with values of $$a'=6.17;\ b'=3;\ R''=CH_3;\ Z'=(O_2C_5H_{10})_{15.83}C_4H_9$$

This corresponds to: Si=8.69%; C=52.85%; H=9.53%
Obtained were: Si=8.45%; C=52.4%; H=9.7%

The product gave a clear solution in water.

Example 11

4100 parts by weight of dried benzene and 3092.8 parts by weight of a polyalkylene glycol monobutyl ether having a molecular weight of 1703 obtained by adding equimolar quantities of ethylene oxide and propylene oxide to butanol, were added to 959.6 parts by weight of siloxane of the general formula:

$$(CH_3)_{1.91}SiO_{0.97}(SO_4)_{0.0074}Cl_{0.135}$$

This mixture was heated to 70° C. An excess of ammonia was then introduced, and after filtration the benzene was removed by distillation. 3640 parts by weight of a product were obtained, which correspond to a yield of 94.5%, having a viscosity of 2315 cp. and corresponding to a theoretical composition according to Formula A (column 8) having the values of $$a'=6.17;\ b'=3;\ R''=CH_3;\ Z'=(O_2C_5H_{10})_{15.83}C_4H_9$$

This corresponds to: Si=8.69%; C=52.85%; H=9.53%
Obtained were: Si=8.45%; C=52.4%; H=9.7%

The product was clearly soluble in water.

Example 12

3400 parts by weight of a dried benzene and 3388 parts by weight of a polyalkylene glycol monomethyl ether having a molecular weight of 1640 obtained by adding equimolar quantities of ethylene oxide and propylene oxide to methanol, were mixed with 962 parts by weight of a siloxane of the general formula $$(CH_3)_{1.89}SiO_{0.97}(SO_4)_{0.0073}Cl_{0.16}$$

An excess of ammonia was introduced into the reaction mixture at a temperature of 22–36° C. After filtration the benzene was removed by distillation. 4183 parts by weight of a substance, which correspond to a yield of 97.9%, were obtained having a viscosity of 1939 cp. This substance had a theoretical composition corresponding to Formula A (column 8) with values of:

$a'=5.6; b'=4; R''=CH_3; Z'=(O_2C_5H_{10})_{15.8}CH_3$

This corresponds to: C=53.3%; H=9.55%; Si=8.1%
Obtained were: C=51.8%; H=8.9%; Si=7.88%

The product gave a clear solution in water.

Example 13

3540 parts by weight of a dry benzene and 3420 parts by weight of a polyalkylene glycol monomethyl ether having a molecular weight of 1640 obtained by adding equimolar quantities of ethylene oxide and propylene oxide to methanol, were mixed with 972 parts by weight of a siloxane of the general formula $(CH_3)_{1.89}SiO_{0.97}(SO_4)_{0.0073}Cl_{0.16}$ An excess of ammonia was introduced into the reaction mixture at a temperature of 69–75° C. After filtration the benzene was removed by distillation. 4188 parts by weight of a substance, which correspond to a yield of 98%, were obtained having a viscosity of 2170 cp. This substance showed a theoretical composition corresponding to Formula A (column 8) with values of:

$a'=5.6; b'=4; R''=CH_3; Z'=CH_3(O_2C_5H_{10})_{15.8}$

This corresponds to: C=53.3%; H=9.55%; Si=8.1%
Obtained were: C=52.1%; H=9.55%; Si=7.69%

The product gave a clear solution in water.

Example 14

3510 parts by weight of an absolute benzene and 3215 parts by weight of a polyalkylene glycol monomethyl ether having a molecular weight of 1620 obtained by adding equimolar quantities of ethylene oxide and propylene oxide to butanol were mixed with 925.1 parts by weight of a siloxane of the general formula:

$(CH_3)_{1.885}SiO_{0.9775}(SO_4)_{0.0074}Cl_{0.1595}$

An excess of ammonia was introduced into the mixture at a temperature of 18–35° C. After subsequent filtration the benzene was removed by distillation. 4056.8 parts by weight of a product were obtained having a viscosity of 1327 cp. This product had a theoretical composition corresponding to Formula A (column 8) with values of $a'=5.56; b'=5; R''=CH_3; Z'=C_4H_9(O_2C_5H_{10})_{15}$ This corresponds to: C=53.3%; H=9.55%; Si=8.11%
Obtained were: C=52.07%; H=9.46%; Si=7.71%

The product was clearly soluble in water.

Example 15

3480 parts by weight of a dry benzene and 3300 parts by weight of a polyalkylene glycol monobutyl ether according to Example 14. An excess of ammonia was introduced into the reaction mixture at a temperature of 70–76° C. After subsequent filtration the benzene was removed by distillation. 4204.4 parts by weight of a substance were obtained having a viscosity of 1442 cp. The theoretical composition of this substance was corresponding to Example 14.

The analysis showed that

C=52.23; H=9.53; Si=7.73

Example 16

3445 parts by weight of dried benzene and 3475 parts by weight of a polyalkylene glycol monobutyl ether according to Example 14 were mixed with 930.9 parts by weight of siloxane of the general formula $(CH_3)_{1.873}SiO_{0.984}(CO_4)_{0.00733}Cl_{01.595}$ An excess of ammonia was introduced into this mixture at a temperature of 19–34° C. After subsequent filtration the benzene was removed by distillation. 4191 parts by weight of a product were obtained, which correspond to a yield of 98%, having a viscosity of 1097 cp. The theoretical composition of this product corresponded to Formula A (column 8) with values of $a'=5.47; b'=8; R''=CH; Z'=C_4H_9(C_5H_{10}O_2)15$ This corresponds to: C=53.45%; H=9.56%; Si=7.86%
Obtained were: C=52.84%; H=9.49%; Si=7.22%

The product was clearly soluble in water.

Example 17

3105 parts by weight of a dried benzene and 3360 parts by weight of a polyalkylene glycol monobutyl ether according to Example 14 were mixed with 928 parts by weight of a siloxane of the general formula $(CH_3)_{1.745}SiO_{0.9875}(SO_4)_{0.00738}Cl_{0.1593}$ An excess of ammonia was introduced into the reaction mixture at a temperature of 21–37° C. After subsequent filtration the benzene was removed by distillation. 4240 parts by weight of a product were obtained, which represent a yield of 99.5%, having a viscosity of 852.5 cp. The theoretical composition was corresponding to Formula A (column 8) with values of $a'=5.45; b'=11; R''=CH_3; Z'=C_4H_9(O_2C_5H_{10})15$ This corresponds to: C=53.45%; H=9.555%; Si=7.88%
Obtained were: C=53.57%; H=9.58%; Si=7.53%

The product gave a clear solution in water.

Example 18

5400 parts by weight of an undried benzene and 3000 parts by weight of a polyalkylene glycol monobutyl ether according to Example 14 were mixed, and the water was removed by distillation of 2000 parts by weight of benzene. 996 parts by weight of a siloxane of the general formula $(CH_3)_{1.91}SiO_{0.97}(SO_4)_{0.00738}Cl_{0.13524}$ were added to the mixture and an excess of ammonia was introduced. After subsequent filtration the benzene was removed by distillation. 3806.9 parts by weight of a product were obtained, which correspond to a yield of 97.6%, having a viscosity of 3218 cp. The theoretical composition was corresponding to Formula A (column 8) with values of $a'=6.17; b'=3; R''=CH_3; Z'=C_4H_9(C_5H_{10}O_2)15.83$ This corresponds to: Si=8.69%; C=52.85%; H=9.53%
Obtained were: Si=8.47%; C=52.93%; H=9.58%

The product gave a clear solution in water.

Example 19

100 parts by weight of a dried benzene and 70.5 parts by weight of a polyethylene glycol monophenyl ether having a molecular weight of 265.8 were mixed with 118.2 parts by weight of a siloxane of the general formula $(CH_3)_{1.895}SiO_{0.973}(SO_4)_{0.00732}Cl_{0.1595}$ An excess of ammonia was introduced into the reaction mixture at a temperature of 75–83° C. After subsequent filtration the benzene was removed by distillation. 166.4 parts by weight of a product were obtained, which correspond to a yield of 92.4%, having a viscosity of 154.6 cp. The theoretical composition of this product was corresponding to Formula A (column 8) with values of $a'=5.6; b'=4; R''=CH_3; Z'=C_6H_5(OC_2H_4)_4$ This corresponds to: C=43.54%; H=7.9%; Si=23.64%
Obtained were: C=42.87%; H=7.92%; Si=22.33%

Example 20

79 parts by weight of polyethylene glycol monomethyl ether having a molecular weight of 418.5 and 90 parts by weight of a dried benzene were mixed with 81.4 parts by weight of a siloxane of the general formula $$(CH_3)_{1.912}SiO_{0.0956}(SO_4)_{0.01451}Cl_{0.1451}$$

An excess of ammonia was introduced into the reaction mixture at a temperature of 70–78° C. After subsequent filtration the benzene was removed by distillation. 137 parts by weight of a product were obtained corresponding to a yield of 89%. This product had a viscosity of 154.1 cp. and a theoretical composition which corresponds to Formula A (column 8) with values of $$a'=6.63;\ b'=3;\ R''=CH_3;\ Z'=CH_3(CH_2.CH_2O)_{8.7}$$

This corresponds to: C=40.6%; H=8.3%; Si=21.3%
Obtained were: C=41.3%; H=8.6%; Si=20.7%

Example 21

295 parts by weight of a dried benzene and 308 parts by weight of a polyalkylene glycol monobutyl ether according to Example 14 were mixed with 50 parts by weight of a polysiloxane of the general formula $$(CH_2=CH)_{0.1725}(CH_3)_{1.677}SiO_{0.992}(SO_4)_{0.00863}Cl_{0.259}$$

An excess of ammonia was introduced into the reaction mixture at a temperature of 21–35° C. After subsequent filtration the benzene was removed by distillation. 338 parts by weight of a product were obtained, which correspond to a yield of 94%, having a viscosity of 1312 cp. The theoretical composition of this product corresponds to Formula A (column 8) with values of $$a'=3.26;\ b'=4;\ R''=90.74\%;\ CH_3,\ 9.26\%\ CH_2=CH$$

all the $CH_2=CH$-groups being attached to a silicon atom which is connected with three oxygen atoms;

$$Z'=C_4H_9(O_2C_5H_{10})_{15}$$

This corresponds to: C=55.1%; H=10.35%; Si=5.84%
Obtained were: C=55.98%; H=11.01%; Si=5.62%

Example 22

150 parts by weight of an absolute benzene and 162 parts by weight of a polyalkylene glycol monobutyl ether according to Example 14 were mixed with 162 parts by weight of a polysiloxane of the general formula $$(C_6H_5)_{0.084}(CH_3)_{1.835}SiO_{0.952}(SO_4)_{0.00668}Cl_{0.167}$$

An excess of ammonia was introduced into the reaction mixture at a temperature of 19–27° C. After subsequent filtration the benzene was removed by distillation. 198 parts by weight of a product were obtained, which correspond to a yield of 95.6%, having a viscosity of 1163 cp. The theoretical composition of this product corresponds to Formula A (column 8) with values of $$a'=5.28;\ b'=2;\ R''=95.64\%\ CH_3,\ 4.36\%\ C_6H_5$$

all the phenyl-groups being attached to a silicon atom which is connected with three oxygen atoms;

$$Z'=C_4H_9(O_2C_5H_{10})_{15}$$

This corresponds to: C=53.6%; H=10.05%; Si=8.15%
Obtained were: C=53.93%; H=10.76%; Si=7.91%

Example 23

1781 parts by weight of dimethyldichlorosilane and 598 parts by weight of methyltrichlorosilane were reacted within three hours while stirring in a round-bottom flask, which is provided with a dropping funnel, a stirrer and a reflux condenser and being connected with a cooling trap, with a mixture of 284 parts by weight of water and 90 parts by weight of sulfuric acid. After these three hours some silane being collected in the cooling trap at —60° C. was added again to the reaction mixture, whereafter the content of the flask was slowly heated to 60° C. After ½ hour the content of the flask suddenly set, but after 12 hours standing at room temperature it got liquid and homogeneous again. In order to complete the equilibration the product was stirred for 2 hours at 120° C.

In practical 100% yield a siloxane of the general formula was obtained $$(CH_3)_{1.66}SiO_{0.938}(SO_4)_{0.0763}Cl_{0.507}$$

This corresponds to a theoretical composition of

C=21.75%; H=5.12%; Si=30.8%;
Cl=19.65% S=2.78%

Obtained were:

C=21.82%; H=5.07%; Si=30.71%;
Cl=19.72%; S=2.63%

106 parts by weight of this siloxane were reacted with 25.5 parts by weight of ethanol and 32.7 parts by weight of isopropylamine and the reaction mixture was stirred for ½ hour. The resulting salt was filtered off and the excess of ethanol was removed by distillation. 76 parts by weight of a water-clear product was formed, which correspond to a yield of 91%, having a viscosity of 13 cp.

| | Percent |
|---|---|
| Content of ethoxy groups | 36.1 |
| Theoretically | 36.4 |

Example 24

14.78 parts by weight of a pure ethanol were mixed with 107.8 parts by weight of a siloxane of the general formula $$(CH_3)_{1.95}SiO_{0.942}(CO_4)_{0.0324}Cl_{0.1298}$$

An excess of ammonia was introduced into the reaction mixture at a temperature of 23–46° C. After subsequent filtration the excess of ethanol was evaporated in a vacuum. 74.8 parts by weight of a product, which correspond to a yield of 96.5% were obtained having a viscosity of 21 cp. The composition of the same corresponded to Formula A (column 8) with values of $$a'=6.47;\ b'=3;\ R''=CH_3;\ Z'=C_2H_5$$

This corresponds to:

C=36.29%; H=7.87%; Si=34.18%

Obtained were:

C=35.95%; H=7.82%; Si=34.32%

Example 25

130 parts by weight of octanol were solved in 100 parts by weight of an absolute benzene and were then mixed with 488.45 parts by weight of a siloxane of the general formula $$(CH_3)_{1.885}SiO_{0.9775}(SO_4)_{0.0074}Cl_{0.1595}$$

An excess of ammonia was introduced at a temperature of 19–32° C. After subsequent filtration 531.5 parts by weight of a product were obtained, which correspond to a yield of 95.4%, having a viscosity of 37.3 cp. The theoretical composition of this product was corresponding to Formula A (column 8) with values of $$a'=5.56;\ b'=5;\ R''=CH_3;\ Z'=C_8H_{17}$$

This corresponds to: C=42.6%; H=9.9%; Si=31.58%
Obtained were: C=41.9%; H=9.75%; Si=31.86%

Example 26

146 parts by weight of a dried butanol were mixed with 977 parts by weight of a siloxane of the general formula $$(CH_3)_{1.873}SiO_{0.984}(CO_4)_{0.00733}Cl_{0.1595}$$

An excess of ammonia was introduced into this mixture at a temperature of 23—38° C. After subsequent filtration traces of butanol being not converted were distilled in a vacuum. 990 parts by weight of a product were obtained, which correspond to a yield of 95.6%, having a viscosity of 43.2 cp. The composition of this product was corresponding to Formula A column 8) with values of $$a'=5.47;\ b'=8;\ R''=CH_3;\ Z'=C_4H_9$$

This corresponds to: C=36.6%; H=8.57%; Si=36.85%
Obtained were: C=36.12%; H=8.49%; Si=37.02%

*Example 27*

This example illustrates the production of a compound which corresponds with Formula A as well as of compounds which are derived from this formula by repeated substitution of an O-bridge for two OZ' groups, R'' being $CH_3$, Z' being $C_4H_8(O_2C_5H_{10})_{15}$, a' being 6.17 and b' being 3.

A mixture of 30.85 mols dimethyl dichlorosilane and 3 mols methyl trichlorosilane was hydrolysed and equilibrated with 0.25 mol sulphuric acid and a quantity of water depending upon the desired degree of condensation and the acid values of the desired products in order to produce the organosilicon polymer starting materials. The equilibrates thus produced had the following acid values (W) and a correspondingly calculated number of places in the average molecule capable of reacting with alcohol:

|     | W ($g \cdot 10^3$) | Reactable places/molecule (= formula A) |
| --- | --- | --- |
| (a) | 1.90 | 5 |
| (b) | 1.67 | 7 |
| (c) | 1.54 | 8 |
| (d) | 1.42 | 11 |

These equilibrates were then reacted in the manner indicated in Example 8 with the polyalkylene glycol monobutyl ether (viscosity 300 cp.) described in that example. There resulted viscous products which all formed clear solutions in water. The viscosities of the reaction products were as follows:

|     | Cp. (20° C.) |
| --- | --- |
| (a) | 1,250 |
| (b) | 2,040 |
| (c) | 2,430 |
| (d) | 3,400 |

This example shows that products of different viscosities can be obtained in a controlled manner from one and the same initial silane mixture and in each case the same polyalkylene glycol monoalkyl ether. In this instance the viscosities can be satisfactorily calculated in advance from the functionality of the initial equilibrates and the viscosity of the poly-ether. The higher viscosity products have the major advantages, inter alia, that they contain more hydrophilic poly-ether groups in the average molecule and that they are thus less incisively changed by minor hydrolysis reactions.

*Example 28*

A mixture of 10.9 parts by weight of water, 4.9 parts by weight of sulphuric acid and 10 parts by weight of dry dioxane were added dropwise to 106 parts by weight of methyl trichlorosilane while stirring. The temperature was then raised to 60° C. and the mixture was equilibrated at this temperature for 5 hours. After evaporation of the dioxane 71.5 parts by weight of a homogeneous product were obtained which according to formula $$SiO_{0.852}CH_3Cl_{1.282}(SO_4)_{0.007}$$

showed the following analytical values:

$SO_4^{--}$: 0.657%; $Cl^-$: 43.7%; Si: 26.7%; C: 12.1% the theoretical values are:

$SO_4^{--}$: 0.657%; $Cl^-$: 44.2%; Si: 27.3%; C: 11.79%

36.4 parts by weight of the siloxane were added dropwise at room temperature to 23.8 parts by weight of dry alcohol and 26.8 parts by weight of isopropylamine. After 2 hours the excess of alcohol was evaporated and the product separated from the precipitated salt. 39.3 parts by weight of an oillike product having a viscosity of 72 cp. were obtained. The following analytical values were determined:

Si: 24.82%; $C_2H_5O$: 49.8%

The theoretical values are:

Si: 24.37%; $C_2H_5O$: 50.7%

*Example 29*

A mixture of 13.76 parts by weight of water and 1.571 parts by weight of 98% sulphuric acid were added dropwise to 106.7 parts by weight of dimethyl dichlorosilane over a period of 10 hours while continuously stirring. The hydrochloric acid was passed through a condenser being fed with tap water in order to liberate the same to a large extent from the dimethyl dichlorosilane entrained. The mixture corresponded to a siloxane of the following formula:

$$SiO_{0.923}(CH_3)_2Cl_{0.113}(SO_4)_{0.0198}$$

In order to balance the losses of dimethyl dichlorosilane caused by the partial hydrolysis this silane had been applied in an excess of 4% by weight.

The temperature was then raised to 110° C. during 15 hours while stirring and was kept at this temperature for 12 hours. A test was made of this homogeneous product. The content of $Cl^-$ and $SO_4^{--}$ was titrimetically determined:

4.458% of $Cl^-$; 2.166% of $SO_4^{--}$

The yield was 60.6 parts by weight of siloxane. The composition of the siloxane was determined by analysis:

$$SiO_{0.933}(CH_3)_2Cl_{0.0984}(SO_4)_{0.01765}$$

The 60.6 parts by weight of the siloxane were mixed with 33.61 parts by weight of γ-acetoxypropyl methyl dichlorosilane and 3.38 parts by weight of hexamethyl disiloxane and were heated to 115° C. over a period of 6 hours while stirring. $Cl^-$, $SO_4^{--}$ and the saponification number of the product were determined:

$Cl^-$: 14.0%; $SO_4^{--}$: 1.34%; saponification number: 89=6.8% of $CH_3CO-$

Accordingly the siloxane corresponded to the average formula:

$$SiO_{0.765}(CH_3)_{1.882}[(CH_2)_3 \cdot O \cdot CO \cdot CH_3]_{0.1598}Cl_{0.397}(SO_4)_{0.01405}$$

97.5 parts by weight of this siloxane were obtained.

87.6 parts by weight of the siloxane were dropped into 186 parts by weight of water in the course of 2 hours while stirring, whereafter the reaction mixture was neutralised by sodium bicarbonate, and the aqueous phase was separated. The resulting oil was liberated from the water by azeotropic distillation with benzene.

The water-white oil had a saponification number of 91.5 and a viscosity of 96 cp.

*Example 30*

A mixture of 12.04 parts by weight of water and 0.443 part by weight of 98% sulphuric acid were added dropwise to 96.3 parts by weight of dimethyl dichlorosilane for 9.5 hours while intensely stirring. The nascent hydrochloric acid was passed through a condenser being fed with tap water in order to remove to a large extent the dimethyl dichlorosilane being extrained. The mixture corresponds to a siloxane of the following formula:

$$SiO_{0.932}(CH_3)_2Cl_{0.1235}(SO_4)_{0.00617}$$

In order to balance the loss of dimethyl dichlorosilane caused by the partial hydrolysis this was applied in an excess of 4% by weight.

The temperature was then raised to 115° C. within a period of 12 hours and was kept at this temperature for 6 hours. The content of Cl⁻ and SO₄⁻⁻ of the homogeneous product was determined:

Cl⁻: 5.16%; SO₄⁻⁻: 0.008105%

A siloxane of the following formula resulted therefrom:

$$SiO_{0.936}(CH_3)_2Cl_{0.1135}(SO_4)_{0.00061}$$

64.3 parts by weight of the siloxane were obtained, which were mixed with 34.3 parts by weight of β-cyanoethylmethyl dichlorosilane. The mixture was heated to 110° C. for 7 hours while stirring. A water clear, slightly viscous and homogeneous product was obtained, which—according to the analysis, 16.15% of Cl⁻ and 5.62% SO₄⁻⁻—had the following composition:

$$SiO_{0.779}(CH_3)_{1.795}[(CH_2)_2 \cdot CN]_{0.205}Cl_{0.429}(SO_4)_{0.00557}$$

A homogeneous oil resulted from the hydrolysis of this product.

Example 31

120.5 g. of a siloxane of the general formula:

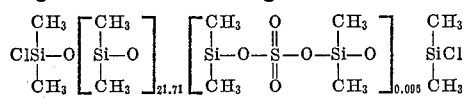

were mixed with 132.5 g. of diphenyl dichlorosilane and equilibrated for 10 hours at a temperature of 120° C. As the mixture turned out to be still inhomogeneous after being cooled 2.66 g. of 98% H₂SO₄ were added and the mixture was equilibrated again for 20 hours at a temperature of 120° C., whereafter the mixture remained homogeneous even while being cooled to room temperature. On hydrolysis it showed a homogeneous oil which precipitated only unimportant quantities of hexaphenyl trisiloxane.

Example 32

Within 10 hours a mixture of 13.76 parts by weight of water and 1.571 parts by weight of 98% sulphuric acid was added dropwise to 106.7 parts by weight of dimethyl dichlorosilane. The HCl was passed through a condenser being fed with tap water in order to remove to a large extent from the dimethyl dichlorosilane entrained. The mixture corresponds to a siloxane of the formula:

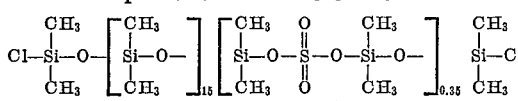

In order to balance the losses of dimethyl dichlorosilane caused by the partial hydrolysis this silane had been applied in an excess of 4% by weight. The temperature was then raised to 110 C. in the course of 15 hours while being stirred and was kept at this temperature for 12 hours. A test was made of this homogeneous product and by titration was found that it contained 4.458% of Cl⁻ and 2.166% of SO₄⁻⁻. Accordingly $m$ and $n$ have the values of $$\frac{\text{Percent Cl}^-}{100} = \frac{70.91}{203.15 + n74.12 + m228.31}$$

$$\frac{\text{Percent SO}_4^{--}}{100} = \frac{96.07m}{203.15 + n74.12 + m228.31}$$

$$m = 0.7381 \frac{\text{Percent SO}_4^{--}}{\text{Percent Cl}^-}$$

$$n = \frac{95.668}{\text{Percent Cl}^-} - 3.0802m - 2.7404$$

$$n = 17.635; \quad m = 0.3587$$

The yield was 60.6 parts by weight of the siloxane. 33.61 parts by weight of γ-acetoxypropyl methyl dichlorosilane were admixed and heated to 115° C. within a period of 6 hours while stirring. Cl⁻, SO₄⁻⁻ and the saponification number of the product were determined by analysis:

Cl⁻: 14.5%; SO₄⁻: 1.39%; saponification number: 90=7.06% of OC·CH₃

According to the mixture the proportion of CH₃ to (CH₂)₃O·OC·CH₃ was 11:1; accordingly the values of $n$ and $m$ corresponded to:

$$\frac{\text{Percent Cl}^-}{100} = \frac{70.91}{131.93 + n98.51 + m277.1}$$

$$\frac{\text{Percent SO}_4^{--}}{100} = \frac{96.07m}{131.93 + n98.51 + m277.1}$$

$$m = 0.7381 \frac{\text{Percent SO}_4^{--}}{\text{Percent Cl}^-}; \quad m = 0.0708$$

$$n = \frac{71.98}{\text{Percent Cl}^-} - 2.813m - 2.354; \quad n = 2.62$$

94 parts by weight of siloxane were obtained.

Example 33

387 g. (0.1632 mol) of a polysiloxane having the general formula $$Cl—Si(CH_3)_2—O—[Si(CH_3)_2—O]_n—[Si(CH_3)_2$$
$$—O—SO_2—O—Si(CH_3)_2—O]_m—Si(CH_3)_2—Cl$$

($n=27.47$; $m=0.583$)

were stirred with 230.2 g. (1.0 mol) of (γ-acetoxy-β-methyl)-propylmethyl dichlorosilane and 21.6 g. (0.266 mol) of hexamethyl disiloxane for 6 hours at a temperature of 120° C. The composition of the resulting equilibrated product was corresponding to the following formula:

$$R_{2.043}Cl_{0.371}O_{0.778}(SO_4)_{0.015}$$

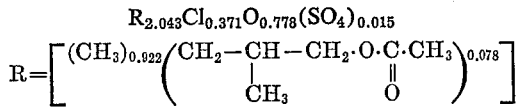

This product was stirred in into 320 ccm. of water for 3 hours, whereafter 200 ccm. of water were added and after a period of 1½ hours stirred again. The resultant emulsion was then neutralised with saturated NaHCO₃-solution while stirring and adding NaCl until complete saturation. After stirring for about 8 hours 2 layers were formed. The upper layer was separated, mixed with benzene and was dehydrated by azeotropic distillation, whereafter the benzene was distilled off in a vacuum at an oil bath temperature of 180° C. The remaining clear oil was miscible with ethanol in all proportions.

η=103 cp.; saponification number 96.4.

Example 34

229.8 parts by weight of a mixture of hexamethyl trisiloxane and octamethyl tetrasiloxane obtained by hydrolysis of dimethyl dichlorosilane and subsequent distillation, 191.2 parts by weight of methylphenyl dichlorosilane and 15.4 parts by weight of dimethyl silylsulphate were heated to 130–145° C. for a period of 24 hours while stirring. A homogeneous siloxane-mixture was obtained having a Cl-value of 16.2 and a SO₄-content of 2.15. This siloxane which nearly corresponded to the theoretically expected composition of $$Si[(CH_3)_{0.865}(C_6H_5)_{0.135}]_2(SO_4)_{0.024}Cl_{0.476}O_{0.738}$$

showed a homogeneous oil on hydrolysis.

While a specific embodiment of the invention has been shown and described in detail to illustrate the application of the invention principles, it will be understood that the invention may be embodied otherwise without departing from such principles.

What is claimed is:

1. A process of preparing an equilibrated mixture of compounds of the general unit formula $$R_xSiO_y(SO_4)_zX_{4-(x+2y+2z)}$$

wherein

R is a member selected from the group consisting of hydrogen, hydrocarbon, γ-cyanopropyl-, β-cyanoethyl-, γ-acyloxypropyl-, β-carboethoxyethyl-, γ-halogenpropyl- and chlorinated phenyl, X is a member selected from the group consisting of chlorine, bromine, iodine and alkoxy, and mixtures of those radicals at least one-tenth of all X atoms being chlorine, $x$, $y$ and $z$ are numbers defined by $$1 \leq x < 3$$
$$0.5 < y > 1.5$$
$$z = 0.0001 - 0.5$$

and $$4 > (x + 2y + 2z) > 2$$

which comprises first reacting a substance selected from the group consisting of a silane and mixtures of silanes of the general formula $$R_x SiX_{4-x}$$

wherein the symbols have the above defined meaning, with water and $z$ mole of sulfuric acid per silicon atom, the total amount of said water and said sulfuric acid added to the reaction per mole of silane being in excess of 0.5 mole but less than $$\frac{4-x}{2}$$

mole, and thereafter equilibrating the reaction product obtained by heating.

2. A process as claimed in claim 1, wherein R is methyl, the value of $y$ is between 0.9 and 1.3 and the value for $z$ is between 0.01 and 0.1, substantially all X atoms being chlorine.

3. A process as in claim 1, wherein the reaction is carried out in several stages, each stage being followed by equilibration of the respective reaction product.

4. A process of preparing organosiloxanes which comprises hydrolyzing an equilibrated mixture of organosiloxanes of the general unit formula $$R_x SiO_y (SO_4)_z X_{4-(x+2y+2z)}$$

wherein

R is a member selected from the group consisting of hydrogen, hydrocarbon, γ-cyanopropyl-, β-cyanoethyl-, γ-acyloxypropyl-, β-carboethoxyethyl-, γ-halogenpropyl- and chlorinated phenyl, active hydrogen, and mixtures of those radicals, X is a member selected from the group consisting of chlorine, bromine, iodine and alkoxy, and mixtures of those radicals, at least one-tenth of all X atoms being chlorine, $x$, $y$ and $z$ are numbers defined by $$1 \leq x < 3$$
$$0.5 < y > 1.5$$
$$z = 0.0001 - 0.5$$

and $$4 > (x + 2y + 2z) > 2$$

and recovering the organo-siloxane material thus produced.

5. A process of preparing an equilibrated mixture of compounds of the general unit formula $$R_x SiO_y (SO_4)_z X_{4-(x+2y+2z)}$$

wherein

R is a member selected from the group consisting of hydrogen, hydrocarbon, γ-cyanopropyl-, β-cyanoethyl-, γ-acyloxypropyl-, β-carboethoxyethyl-, γ-halogenpropyl- and chlorinated phenyl, X is a member selected from the group consisting of chlorine, bromine, iodine and alkoxy and mixtures thereof, substantially all X being chlorine, $x$, $y$ and $z$ are numbers defined by $$1 < x < 3$$
$$y = 0.9 - 1.3$$
$$z = 0.01 - 0.1$$
$$4 > (x + 2y + 2z) > 2$$

which comprises reacting in a first stage a first substance selected from the group consisting of a silane and silane mixtures of the general formula $$R_x SiX_{4-x}$$

wherein R is methyl, and $x$ and X have the above meaning, with water and sulfuric acid to form a siloxane mixture, thereafter equilibrating said siloxane mixture, then adding to said equilibrated siloxane mixture in a second stage a second substance selected from the group consisting of a silane and silane mixtures of the general formula $$R_x SiX_{4-x}$$

wherein $x$ and X have the above meaning, and each Si is linked to at least one R selected from the group consisting of hydrogen, γ-acyloxypropyl-, β-carboethoxyethyl-, and β-cyanoethyl, whereafter the mixture thus obtained is again equilibrated, the total amount of said water and said sulfuric acid being added in said first stage, the amount of sulfuric acid corresponding to $z$ mole of sulfuric acid per silicon atom in the final mixture, said total amount of water and sulfuric acid added per mole of all silanes being in excess of 0.5 mole but being less than $$\frac{4-x}{2}$$

mole, said total amount, moreover, being chosen to be insufficient to split off all chlorine atoms of said first substance in said first stage.

6. A process of preparing an equilibrated mixture of compounds of the general unit formula $$R_x SiO_y (SO_4)_z X_{4-(x+2y+2z)}$$

where

R is a member selected from the group consisting of hydrogen, hydrocarbon, γ-cyanopropyl-, β-cyanoethyl-, γ-acyloxypropyl-, β-carboethoxyethyl-, γ-halogenpropyl- and chlorinated phenyl.

X is a member selected from the group consisting of chlorine, bromine, iodine and alkoxy, and mixtures of these radicals at least one-tenth of all X atoms being chlorine, $x$, $y$ and $z$ are numbers defined by $$1 = \leq x < 3$$
$$0.5 < y > 1.5$$
$$z = 0.0001 - 0.5$$

and $$4 > (x + 2y + 2z) > 2$$

which comprises first reacting a mixture of $(2a' + a'b')$ mole of $R_2 SiX_2$ and $b'$ mole of $RSiX_3$ with $$(2a' + a'b' + b' - 1)$$

mole of water and a quantity of sulfuric acid which in the presence of the respective amount of water is insufficient to split off all X-atoms, and thereafter equilibrating the reaction product obtained by heating, the symbols R and X having the above meaning, $$a' = 0.5 - 100$$

and $$b' = 2 - 50$$

7. An equilibrated mixture of compounds of the unit formula $$R_x SiO_y (SO_4)_z X_{4-(x+2y+2z)}$$

wherein

R is a member selected from the group consisting of hydrogen, hydrocarbon, γ-cyanopropyl-, β-cyanoethyl-, γ-acyloxypropyl-, β-carboethoxyethyl-, γ-halogenpropyl- and chlorinated phenyl, and mixtures of those radicals, X is a member selected from the group consisting of chlorine, bromine, iodine and alkoxy, and mixture of those radicals, at least one-tenth of all X atoms being chlorine,
$x$, $y$ and $z$ are numbers defined by $$1 \leq x < 3$$
$$0.5 < y > 1.5$$
$$z = 0.0001 - 0.5$$

and $$4 > (x + 2y + 2z) > 2$$

8. Compounds as in claim 7, wherein R is methyl, the value of $y$ is between 0.9 and 1.3, and the value for $z$ is between 0.01 and 0.1, substantially all X atoms being chlorine.

9. Compounds as claimed in claim 7, wherein $y$ and $x$ are defined by $$0.9 < y > 1.3$$

and $$1.5 < x > 2.1$$

10. An equilibrated mixture of organosiloxane compounds of the unit formula:

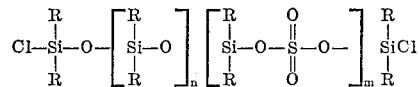

wherein the various R's represent monovalent hydrocarbon radicals, $n = 1-200$ and $m = 0.001-10$.

References Cited by the Examiner
UNITED STATES PATENTS

| | | | |
|---|---|---|---|
| 2,437,204 | 3/48 | McGregor et al. | 260—448.2 |
| 2,834,748 | 5/58 | Bailey et al. | 260—448.8 |
| 2,895,853 | 7/59 | Bailey et al. | 260—448.2 |
| 2,909,549 | 10/59 | Bailey | 260—448.8 |

FOREIGN PATENTS

| | | |
|---|---|---|
| 1,011,420 | 7/57 | Germany. |
| 1,034,631 | 7/58 | Germany. |
| 622,129 | 4/49 | Great Britain. |
| 644,528 | 10/50 | Great Britain. |

OTHER REFERENCES

Schmidt et al.: "Angewandte Chemie," volume 70 (1958), 260—448.2, pages 469–70 and 657.

TOBIAS E. LEVOW, *Primary Examiner.*